(12) United States Patent
Venkatesan et al.

(10) Patent No.: US 7,070,878 B2
(45) Date of Patent: *Jul. 4, 2006

(54) MULTI-LAYERED OXYGEN ELECTRODE WITH PEROXIDE DECOMPOSITION CATALYST

(75) Inventors: Srinivasan Venkatesan, Southfield, MI (US); Hong Wang, Troy, MI (US); Stanford R. Ovshinsky, Bloomfield Hills, MI (US); Boyko Aladjov, Rochester Hills, MI (US); Subhash Dhar, Bloomfield, MI (US)

(73) Assignee: Ovonic Fuel Cell Company LLC, Rochester Hills, MI (US)

( * ) Notice: Subject to any disclaimer, the term of this patent is extended or adjusted under 35 U.S.C. 154(b) by 532 days.

This patent is subject to a terminal disclaimer.

(21) Appl. No.: 10/295,076

(22) Filed: Nov. 15, 2002

(65) Prior Publication Data

US 2004/0031679 A1    Feb. 19, 2004

Related U.S. Application Data

(63) Continuation-in-part of application No. 10/219,788, filed on Aug. 15, 2002.

(51) Int. Cl.
*H01M 4/90*    (2006.01)
*H01M 4/96*    (2006.01)
*C25B 11/03*   (2006.01)
*C25B 11/06*   (2006.01)

(52) U.S. Cl. .............................. 429/42; 429/40; 429/41; 429/44; 204/280; 204/283; 204/284; 204/290.01; 204/290.03; 204/290.05; 204/290.06; 204/290.07; 204/294

(58) Field of Classification Search ................ 429/40, 429/41, 42, 44; 204/290.01, 290.03, 290.04, 204/290.05, 290.06, 290.07, 281, 284, 294, 204/280, 283
See application file for complete search history.

(56) References Cited

U.S. PATENT DOCUMENTS

| | | | |
|---|---|---|---|
| 6,335,112 B1 * | 1/2002 | Asukabe et al. | 429/30 |
| 6,471,850 B1 * | 10/2002 | Shiepe et al. | 205/628 |
| 6,632,557 B1 * | 10/2003 | Curelop et al. | 429/42 |
| 6,716,551 B1 * | 4/2004 | Peinecke et al. | 429/39 |
| 6,783,885 B1 * | 8/2004 | Shiepe et al. | 429/38 |
| 6,835,489 B1 * | 12/2004 | Venkatesan et al. | 429/40 |
| 2003/0082435 A1 * | 5/2003 | Muthuswamy et al. | 429/44 |

* cited by examiner

*Primary Examiner*—Bruce F. Bell
(74) *Attorney, Agent, or Firm*—Frederick W. Mau, II; Marvin S. Siskind (57) ABSTRACT

A layered oxygen electrode incorporating a peroxide decomposition catalyst. The design of the oxygen electrode promotes oxygen dissociation and absorption within the oxygen electrode. The oxygen electrode has differing layers of hydrophobicity which allow chemical impregnation of the active catalyst material into the oxygen electrode where the active catalyst material is needed most.

18 Claims, 10 Drawing Sheets

MULTI-LAYERED OXYGEN ELECTRODE WITH PEROXIDE DECOMPOSITION CATALYST

CROSS REFERENCE TO RELATED APPLICATIONS

The present invention is a continuation-in-part of, and is entitled to the benefit of the earlier filing date and priority of, co-pending U.S. patent application Ser. No. 10/219,788, which is assigned to the same assignee as the current application, entitled "Double Layer Oxygen Electrode And Method Of Making", filed Aug. 15, 2002, the disclosure of which is hereby incorporated by reference.

FIELD OF THE INVENTION

The present invention generally relates to oxygen electrodes utilized in a variety of fuel cells. More particularly, the present invention relates to an oxygen electrode including a peroxide decomposition catalyst.

BACKGROUND

As the world's population expands and its economy increases, the atmospheric concentrations of carbon dioxide are warming the earth causing climatic changes. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. application Ser. No. 09/444,810, entitled "A Hydrogen-based Ecosystem" filed on Nov. 22, 1999 for Ovshinsky, et al., which is herein incorporated by reference and U.S. patent application Ser. No. 09/435,497, entitled "High Storage Capacity Alloys Enabling a Hydrogen-based Ecosystem", filed on Nov. 6, 1999 for Ovshinsky et al., which is herein incorporated by reference), hydrogen will also provide a general carbon-free fuel to cover all fuel needs.

A dramatic shift has now occurred, in which the problems of global warming and climate change are now acknowledged and efforts are being made to solve them. Therefore, it is very encouraging that some of the world's biggest petroleum companies now state that they want to help solve these problems. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D focus is on P.E.M. (Proton Exchange Membrane) fuel cells. The P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, and specifically carbon monoxide (CO). Also, because of the acidic nature of the P.E.M fuel cell, the remainder of the materials of construction of the fuel cell need to be compatible with such an environment, which again adds to the cost thereof. The proton exchange membrane itself is quite expensive, and because of its low conductivity, inherently limits the power performance and operational temperature range of the P.E.M. fuel cell (the PEM is nearly non-functional at low temperatures, unlike the fuel cell of the instant invention). Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuel cells in that they have higher operating efficiencies, they use less expensive materials of construction, and they have no need for expensive membranes. The alkaline fuel cell also has relatively higher ionic conductivity in the electrolyte, therefore it has a much higher power capability. Unfortunately, conventional alkaline fuel cells still suffer from certain disadvantages. For instance, conventional alkaline fuel cells still use expensive noble metals catalysts in both electrodes, which, as in the P.E.M. fuel cell, are susceptible to gaseous contaminant poisoning. While the conventional alkaline fuel cell is less sensitive to temperature than the PEM fuel cell, the active materials of conventional alkaline fuel cell electrodes become very inefficient at low temperatures.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolytic solution. The particular materials utilized for the hydrogen electrode and oxygen electrode are important since they must act as efficient catalysts for the reactions taking place.

In an alkaline fuel cell, the reaction at the hydrogen electrode occurs between the hydrogen fuel and hydroxyl ions ($OH^-$) present in the electrolyte, which react to form water and release electrons:

$$H_2 + 2OH^- \rightarrow 2H_2O + 2e^-.$$

Oxygen reduction reaction in fuel cell electrodes, especially in alkaline fuel cell electrodes, takes place via 2 steps of 2 electrons each. Pure platinum surfaces and some macrocyclics exhibit a direct 4 electron transfer. Once the platinum is covered by an impurity or oxides, direct 4 electron transfer becomes unavailable. The consequence of the two step reduction process is the formation of peroxyl ions as per the following scheme:

$$O_2 + H_2O + 2e^- \rightarrow HO_2^- + OH^- \quad (1)$$

$$HO_2^- + H_2O + 2e^- \rightarrow 3OH^- \quad (2)$$

Overall: $O_2 + 2H_2O + 4e^- \rightarrow 4OH^-$

Although the final reaction is still hydroxyl ion formation, in direct 4 electron transfer or in the 2 step process, the important difference is in the formation of the intermediate species. The peroxyl ions are very reactive and will oxidize many materials. In a porous oxygen diffusion electrode where the electrochemical reactions are taking place at the surface, this intermediate species formation becomes critical to the performance of the fuel cell. The pores at the electrode surface become sites of oxygen reduction as long as the pores have access to the electrolyte. Once the oxygen reduction takes place, peroxide formation as an intermediate of the product of reaction occurs within the pores. Since the pores are by definition not "through hole" pores, the peroxide has no way to escape except by diffusion out into the bulk. Depending upon the conditions of operation, diffusion can be slow. That implies that the peroxide has a finite residence time within the pores. During this time it can (1) cause oxidation of the teflonized carbon, (2) decompose and form gas bubbles that can block the pores causing a loss of surface area, and (3) react with the active catalyst material and destroy its character. The reaction mentioned in (2) is called a disproportionation reaction and is shown below:

$$2H_2O_2 \rightarrow 2H_2O + O_2$$

All three of these factors can lead to gradual flooding and a loss of performance within the oxygen electrode. The effect of peroxide formation/reaction has been observed in practice as a gradual increase in polarization and as a sudden loss of performance caused by "break-through" in flooding.

The production of peroxides is an undesirable phenomenon. This is not a feature which affects all fuel cells. It would be desirable to completely eliminate peroxide formation, however, other than using pure platinum as a catalyst, and that too, with no guarantee that it would remain as a direct 4 electron transfer all the time, there appears to be no method of guaranteeing a 4 electron transfer.

The present invention provides a solution to the problem of peroxide formation within the oxygen electrode. The present invention discloses an oxygen electrode incorporating a peroxide decomposition catalyst which eliminates the effect of the peroxide formation. The inclusion of the peroxide decomposition catalyst as disclosed by the present invention results in improved performance of the fuel cell.

SUMMARY OF THE INVENTION

The object of the instant invention is a multi-layered oxygen electrode impregnated with active catalyst material and a peroxide decomposition catalyst. The layered structure of the oxygen electrode promotes oxygen dissociation and absorption within the oxygen electrode. The layered structure of the oxygen electrode also allows impregnation of the active catalyst material into the oxygen electrode where the active catalyst material is needed most.

The present invention discloses an oxygen electrode including a porous active material layer having a built-in hydrophobic character, a porous gas diffusion layer having a greater built-in hydrophobic character than the porous active material layer, and two current collector grids. The porous active material layer and the porous gas diffusion layer are positioned adjacent to each other. The current collector grids are placed outside of the two layers forming a sandwich structure.

The porous active material layer of the oxygen electrode is composed of a carbon matrix. The carbon matrix is composed of polytetrafluoroethylene coated carbon particles containing approximately 15–25% polytetrafluoroethylene by weight. The porous active material layer of the oxygen electrode may also contain 0–50% by weight of a peroxide decomposition catalyst. The peroxide decomposition catalyst may be $MnO_2$, $MnO$, $MoO_3$, $KMnO_2$, cobalt oxides, nickel oxides, iron oxides, transition metal oxides, and mixtures thereof. The porous active material layer may also be impregnated with an active catalyst material. The active catalyst material may be deposited from $AgNO_3$, a $AgNO_3$/Ga$(NO)_3$ mixture, a $AgNO_3$/$LiNO_3$ mixture, $Co(NO_3)_2$, a cobalt amine complex, $NI(NO_3)_2$, $Mn(NO_3)_2$, cyano complexes, organo-metallic complexes, amino complexes, citrate/tartrate/lactate/oxalate complexes, transition metal complexes, and mixtures thereof. After impregnation, the active catalyst material forms submicron to nano particles within said carbon matrix. The porous active material layer may be impregnated with the catalyst via chemical or electrochemical impregnation with or without vacuum, chemical vapor deposition, plasma vapor deposition or other impregnation techniques.

The porous gas diffusion layer of the oxygen electrode is composed of a carbon matrix. The carbon matrix contains polytetrafluoroethylene coated carbon particles containing approximately 40–60% polytetrafluoroethylene by weight.

The current collector grids each comprise at least one selected from the group consisting of mesh, grid, matte, expanded metal, foil, foam and plate (with or without perforations).

The oxygen electrode of the present invention may be prepared by first preparing a first carbon matrix having a built-in hydrophobic character, preparing a second carbon matrix having a built-in hydrophobic character greater than said first carbon matrix; and layering the first carbon matrix and the second carbon matrix between a two current collector grids. After placing the two layers between the current collector grids, a pressure of 2 tons per 100 cm$^2$ is applied to the oxygen electrode followed by heat treating at 375 degrees Celsius for 15 to 30 minutes, followed by applying a pressure of 60 tons per 100 cm$^2$ to the oxygen electrode. Resulting is a porous oxygen electrode having differing layers of hydrophobicity.

Once formed, the oxygen electrode is impregnated with an active catalyst material. The active catalyst material is deposited into the oxygen electrode layer having the least hydrophobicity. The active catalyst material may be impregnated from $AgNO_3$, a $AgNO_3/Ga(NO)_3$ mixture, a $AgNO_3/LiNO_3$ mixture, $Co(NO_3)_2$, a cobalt amine complex, $NI(NO_3)_2$, $Mn(NO_3)_2$, cyano complexes, organometallic complexes, amino complexes, citrate/tartrate/lactate/oxalate complexes, transition metal complexes, and mixtures thereof. The active catalyst material forms submicron to nano particles within the oxygen electrode.

The oxygen electrode is preferably impregnated with the active catalyst material using a chemical impregnation process. The chemical impregnation process includes the steps of first preparing an aqueous solution of active catalyst material, dipping the oxygen electrode into the aqueous solution of active catalyst material, simultaneously pulling the aqueous solution of active catalyst material into the oxygen electrode via vacuum, drying the oxygen electrode at room temperature, heat treating the oxygen electrode at 50 degrees Celsius to remove any water from the oxygen electrode; and heat treating the oxygen electrode at 300–375 degrees Celsius to remove and decompose the nitrates remaining inside the oxygen electrode. Alternatively, the oxygen electrode may be impregnated with the active catalyst material using a chemical vapor deposition impregnation process or plasma vapor deposition impregnation process.

DETAILED DESCRIPTION OF THE INVENTION

Figure 1:
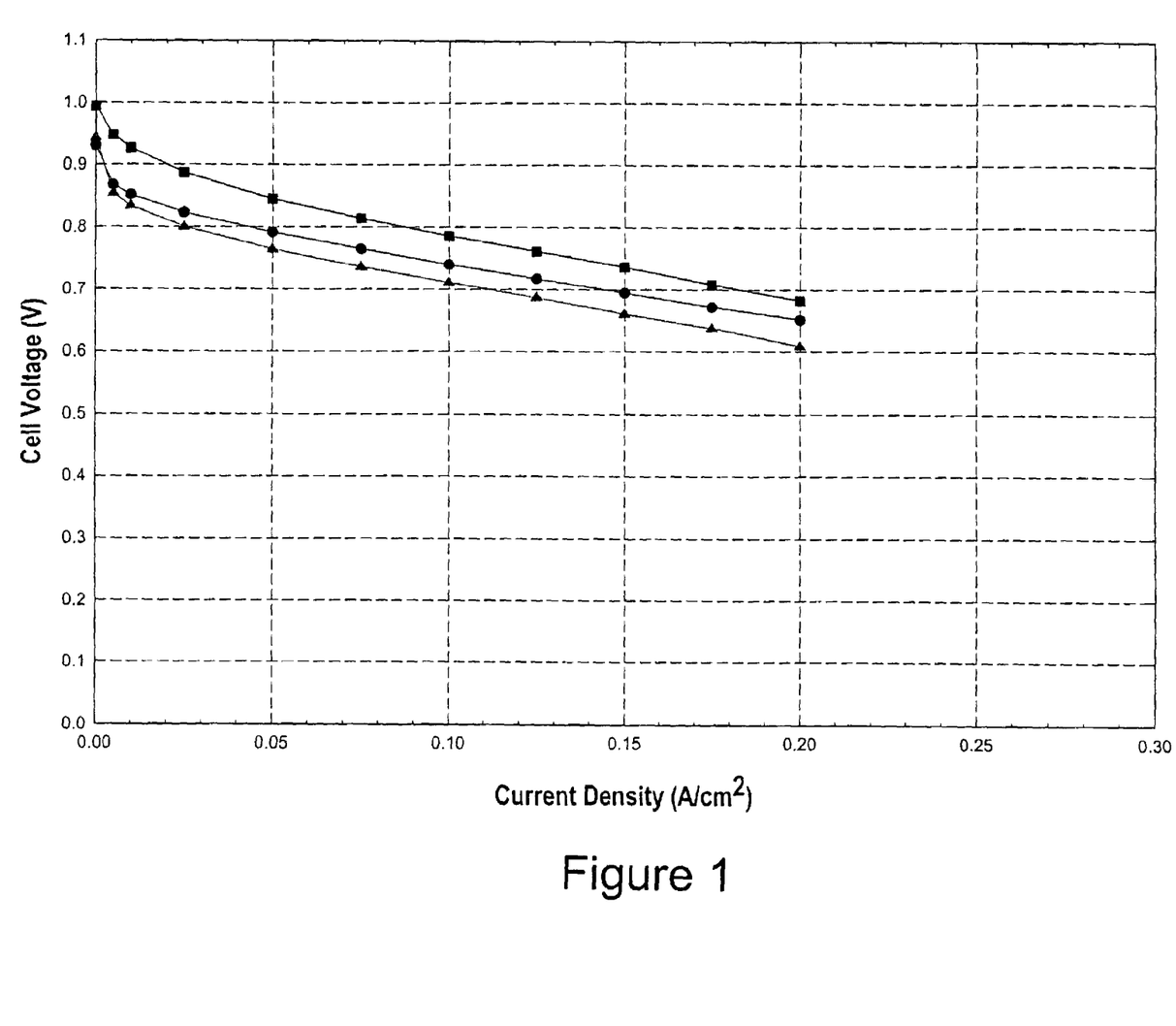
FIG. 1, shows the performance of the oxygen electrode in accordance with the present invention as compared to present day oxygen electrodes.

The present invention discloses oxygen electrodes including peroxide decomposition catalyst materials and active catalyst materials. These electrodes are easily prepared and have excellent reproducibility. Due to the method of preparation of the oxygen electrodes, the degree of hydrophobicity within the electrodes is easily controlled. The method of preparation also allows impregnation of the active catalyst material into the electrode where the active catalyst material is most needed. With the active catalyst material being chemically impregnated into the oxygen electrode, the amount and type of active material catalyst can be controlled by a variety of variables including current density, temperature, and electrolyte concentration. Shown in FIG. 1. is the performance of an oxygen electrode in accordance with the present invention as compared to standard oxygen electrodes not having the characteristics described herein, wherein the electrodes utilize $Ag_2O$ as an active catalyst material. The oxygen electrode in accordance with the present invention has varying degrees of hydrophobicity within the electrode matrix and is chemically impregnated with active catalyst material, whereas the standard oxygen electrodes have active catalyst material simply mixed with the electrode material and do not have varying degrees of hydrophobicity. The oxygen electrode in accordance with the present invention (■) shows improved performance over a standard oxygen electrode with $Ag_2O$ (▲) and a teflonated oxygen electrode with $Ag_2O$ (●).

Figure 2:
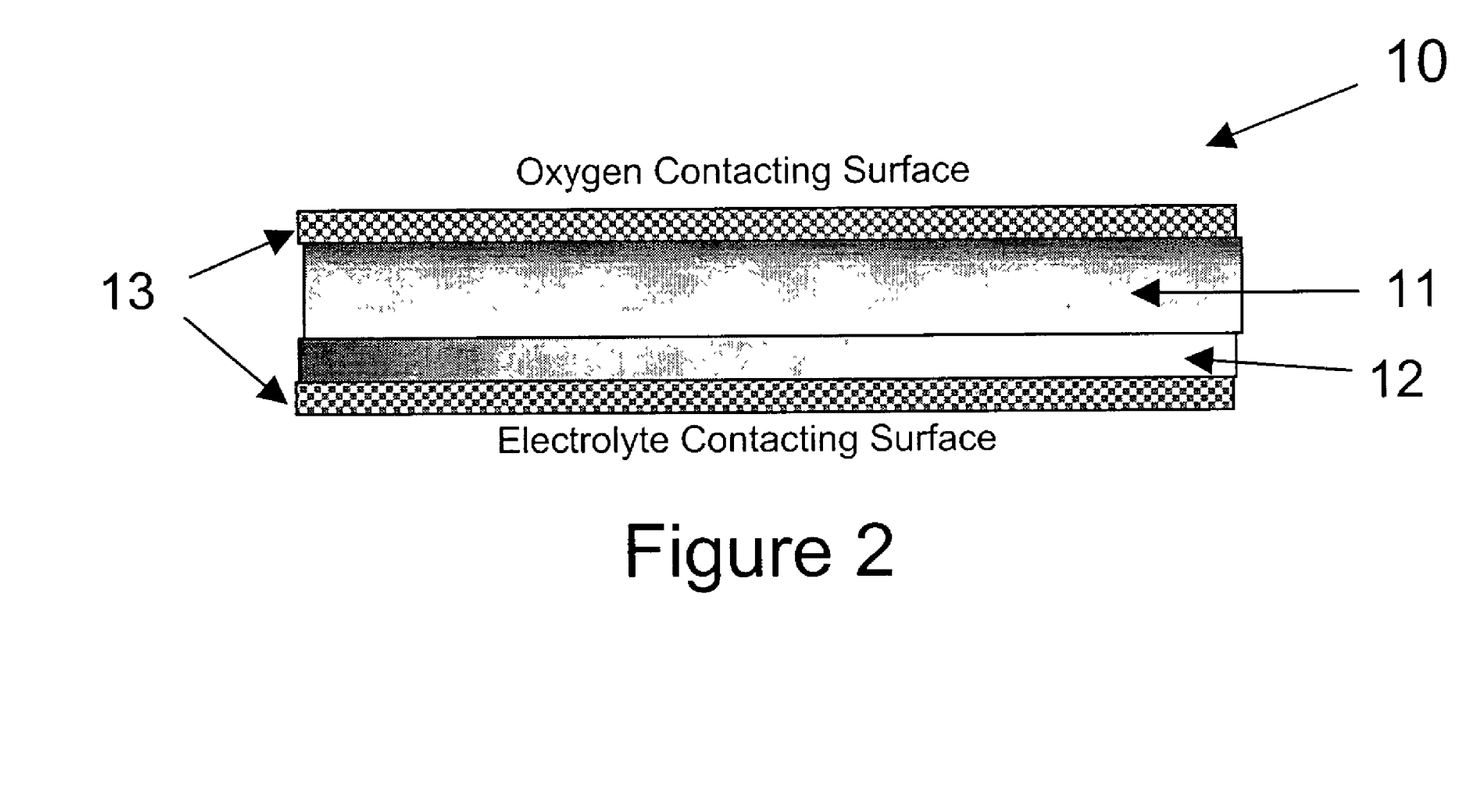
FIG. 2, shows a depiction of the oxygen electrode in accordance with the present invention.
Figure 3:
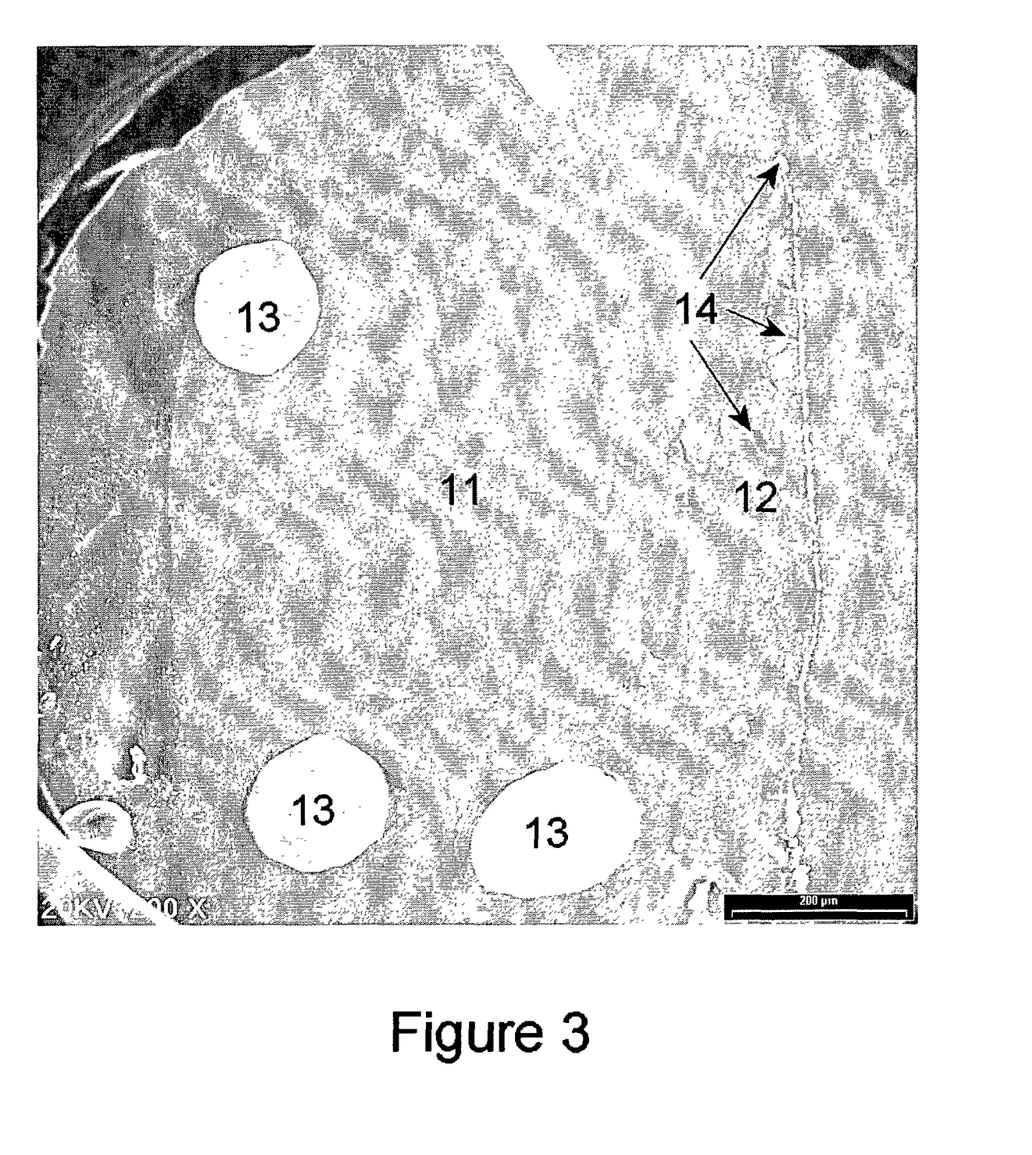
FIG. 3, shows a magnified image of the oxygen electrode in accordance with the present invention.

The double layer oxygen electrode 10 in the preferred embodiment of the present invention has a layered structure and is exemplified in FIG. 2. A magnified image of the double layer oxygen electrode 10 in accordance with the present invention is shown in FIG. 3. The layered structure promotes oxygen dissociation and absorption within the oxygen electrode. The double layer oxygen electrode 10 is composed of a gas diffusion layer 11, an active material layer 12, and two current collector grids 13. The gas diffusion layer and the active material layer are placed adjacent to one another with the current collector grids 13 being placed outside the gas diffusion layer 11 and active material layer 12 thereby forming a sandwich configuration. When used inside a fuel cell, the current collector grid in contact with the active material layer 12 is in contact with the electrolyte solution while the current collector grid in contact with the gas diffusion layer 11 is in contact with the air or oxygen stream.

The oxygen electrode needs a barrier means to isolate the electrolyte, or wet, side of the oxygen electrode from the gaseous, or dry, side of the oxygen electrode. A beneficial means of accomplishing this is by inclusion of a hydrophobic component comprising a halogenated organic polymer compound, particularly polytetrafluoroethylene (PTFE) within the electrode. With this in mind, the gas diffusion layer 11 is primarily a carbon matrix composed of carbon particles coated with polytetrafluoroethylene. The carbon matrix is in intimate contact with a current collector grid which provides mechanical support to the carbon matrix. The carbon particles may be carbon black known as Vulcan XC-72 carbon or Acetylene Black (Trademark of Cabot Corp.), which is well known in the art. The gas diffusion layer may contain approximately 30–60 percent by weight polytetrafluoroethylene with the remainder consisting of carbon particles.

The active material layer 12 may be composed of a carbon matrix composed of polytetrafluoroethylene coated carbon particles and a peroxide decomposition catalyst with an active catalyst material 14 chemically impregnated within the carbon matrix. The carbon matrix is in intimate contact with a current collector grid which provides mechanical support to the carbon matrix. The carbon particles in the active material layer may be carbon black known as Black Pearl 2000 (Trademark of Cabot Corp.). The carbon particles are coated with polytetrafluoroethylene wherein the teflonated carbon particles preferably contain approximately 20% polytetrafluoroethylene by weight. The amount of the peroxide decomposition catalyst may vary in the carbon matrix from 0.0 to 50 weight percent. The peroxide decomposition catalyst may be $MnO_2$, $MnO$, $MoO_3$, $KMnO_2$, cobalt oxides, nickel oxides, iron oxides, transition metal oxides, and mixtures thereof. The peroxide decomposition catalyst is incorporated into the carbon matrix to help improve stability of the oxygen electrode. Stability of the oxygen electrode is adversely affected by peroxides formed as a byproduct of the reduction of oxygen. The reaction resulting from the use of $MnO_2$ as the peroxide decomposition catalyst is shown below:

$$2MnO_2 + H_2O_2 \rightarrow Mn_2O_3 + O_2 + H_2O \qquad (1)$$

$$Mn_2O_3 + H_2O_2 \rightarrow 2MnO_2 + H_2O \qquad (2)$$

Overall: $2H_2O_2 \rightarrow 2H_2O + O_2$

The peroxide decomposition catalyst eliminates the hydrogen peroxide thereby maintaining stability within the oxygen electrode. Preferably, MnO is used to promote better stability within the oxygen electrode as compared to $MnO_2$. The MnO reacts to form $MnO_2$ in a reversible oxidation reaction whereas the $MnO_2$ undergoes oxidation and remains at an even higher oxidation state.

Figure 4:
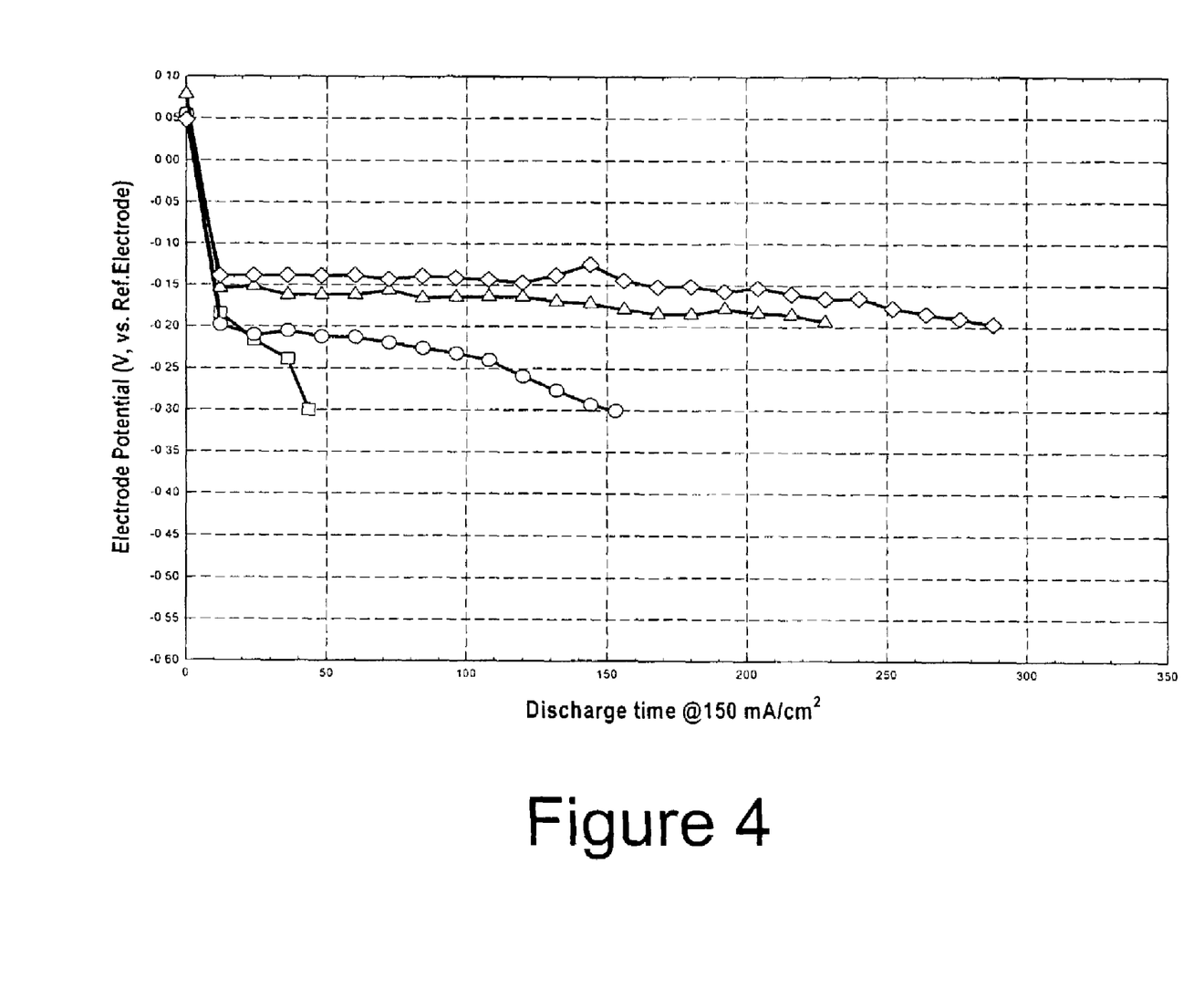
FIG. 4, shows a plot of the life tests of oxygen electrodes in accordance with the present invention having varying amounts of peroxide decomposition catalyst incorporated into the active material layer of the oxygen electrode.
Figure 5:
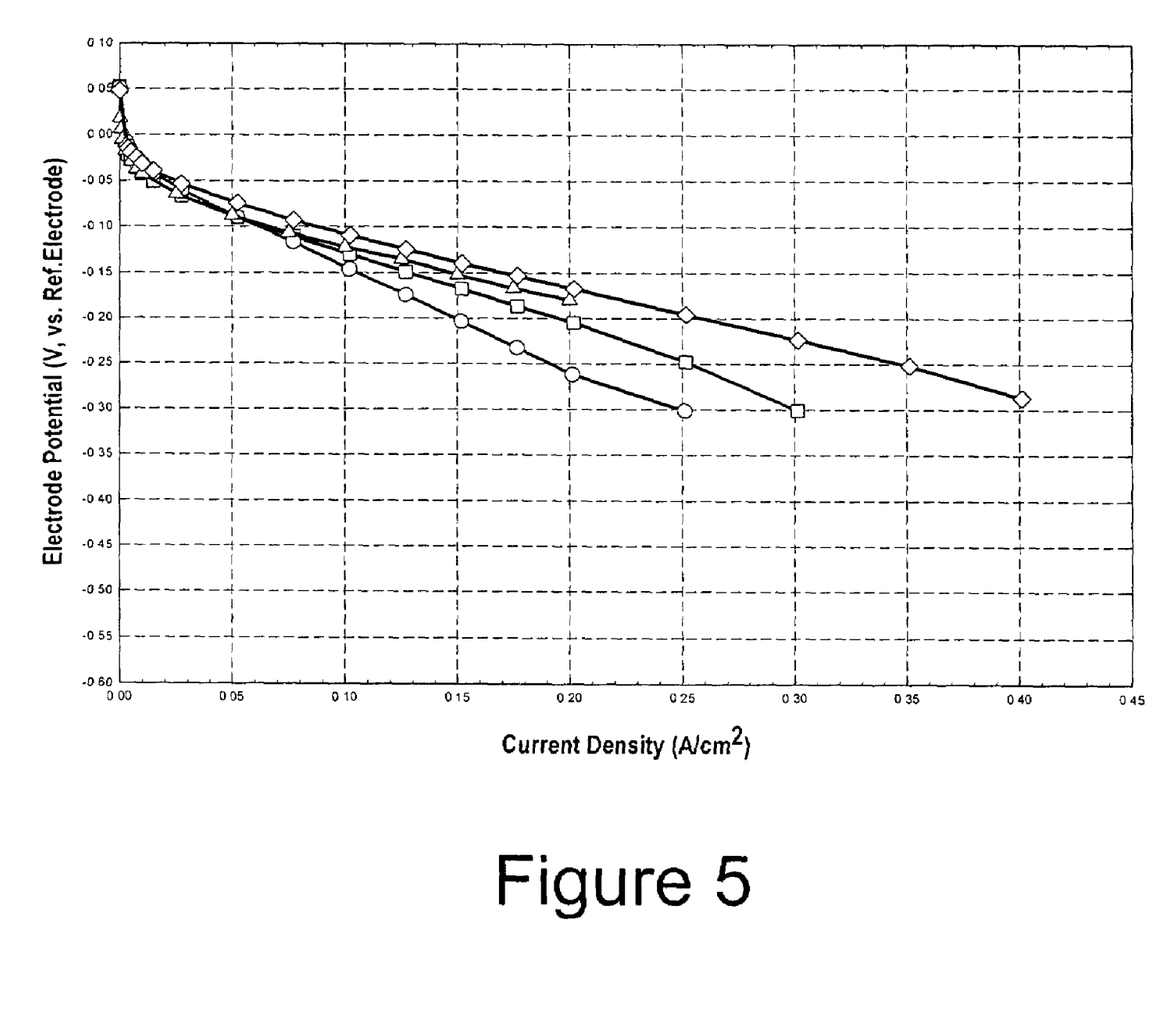
FIG. 5, shows the performance of oxygen electrodes in accordance with the present invention having varying amounts of peroxide decomposition catalyst incorporated into the active material layer of the oxygen electrode.

Shown in FIG. 4 and FIG. 5, are plots of the life tests and performance of the oxygen electrodes incorporating the peroxide decomposition catalyst. Shown are oxygen electrodes having an active material layer incorporating 5 weight percent $MnO_2$ (□), 10 weight percent $MnO_2$ (○), 15 weight percent $MnO_2$ (△), 25 weight percent $MnO_2$ (▽), and 30 weight percent $MnO_2$ (◇). As shown by the plots, an increase in the lifetime and performance of the oxygen electrodes is realized where $MnO_2$ is added up to 30 weight percent in the active material layer. Addition of the peroxide decomposition catalyst in excess of 30 weight percent results in lowering the performance of the oxygen electrode as a result of a loss of surface area due to a partial substitution of the high surface area carbon for the peroxide decomposition catalyst. However, in some cases a compromise in performance may be needed to increase cycle life.

Figure 6:
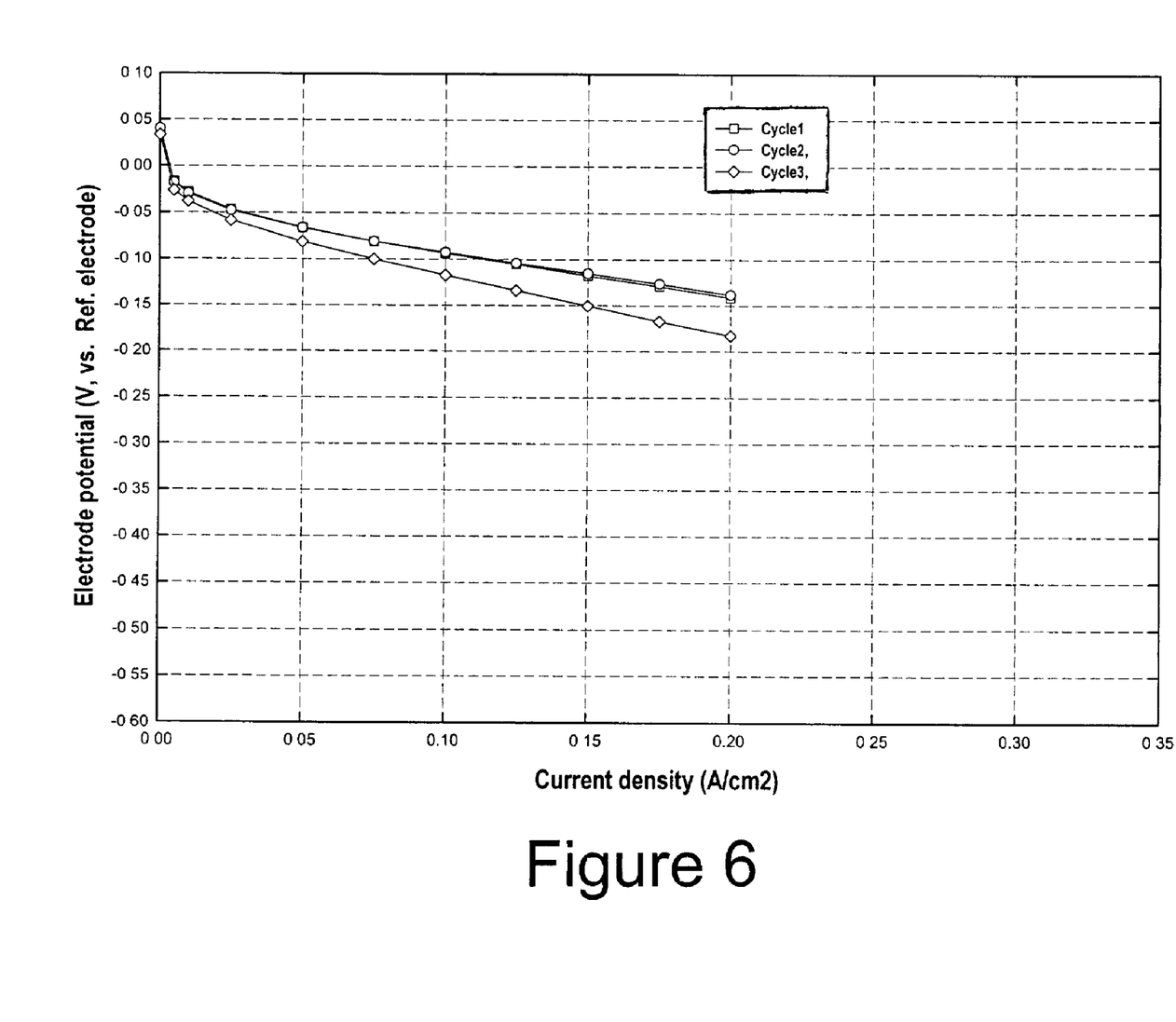
FIG. 6, shows the performance of an oxygen electrode in accordance with the present invention wherein the peroxide decomposition catalyst is precipitated into the active material layer of the oxygen electrode.
Figure 7:
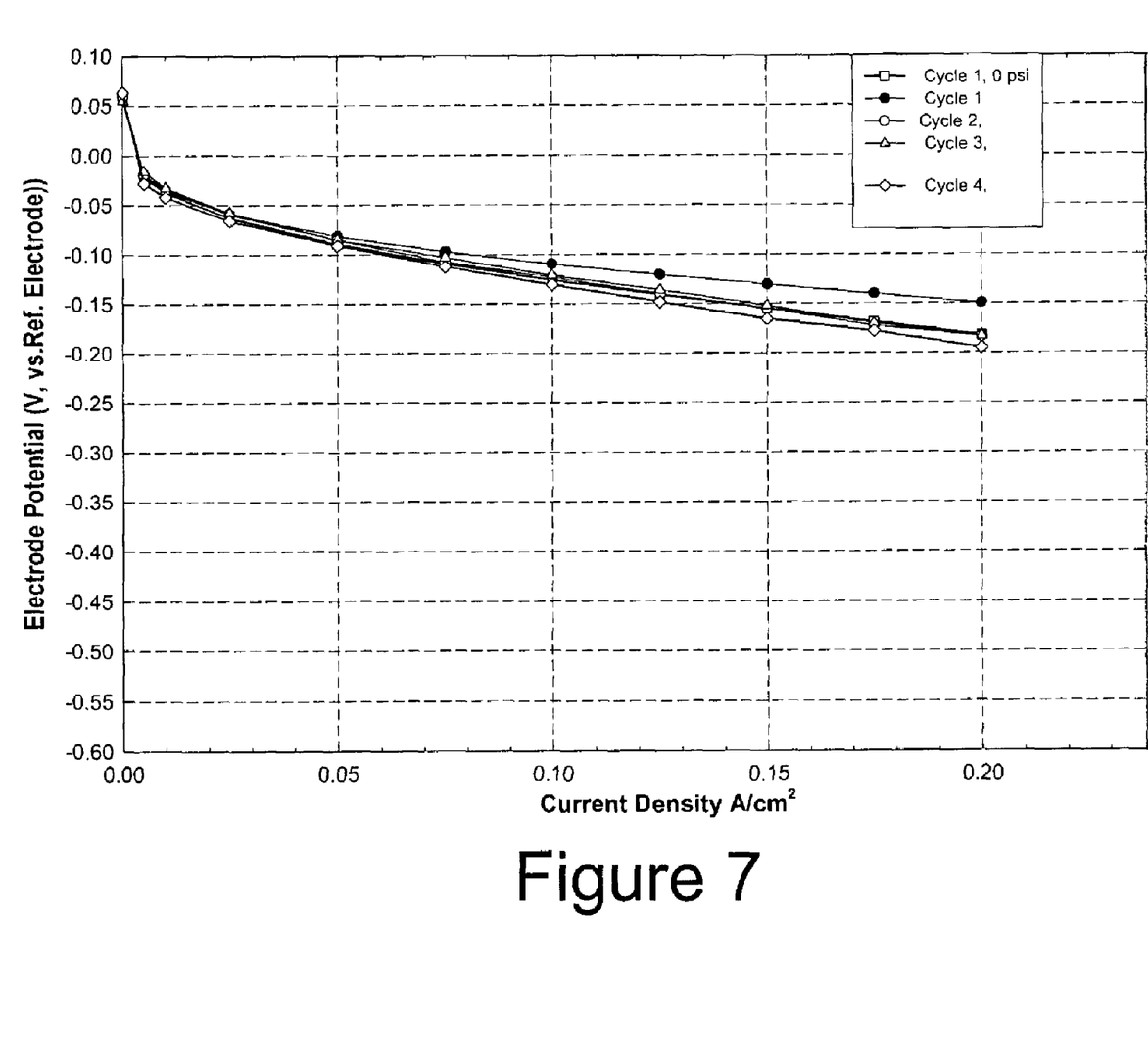
FIG. 7, shows the performance of an oxygen electrode in accordance with the present invention wherein the peroxide decomposition catalyst is precipitated into the active material layer of the oxygen electrode with the active catalyst material.
Figure 8:
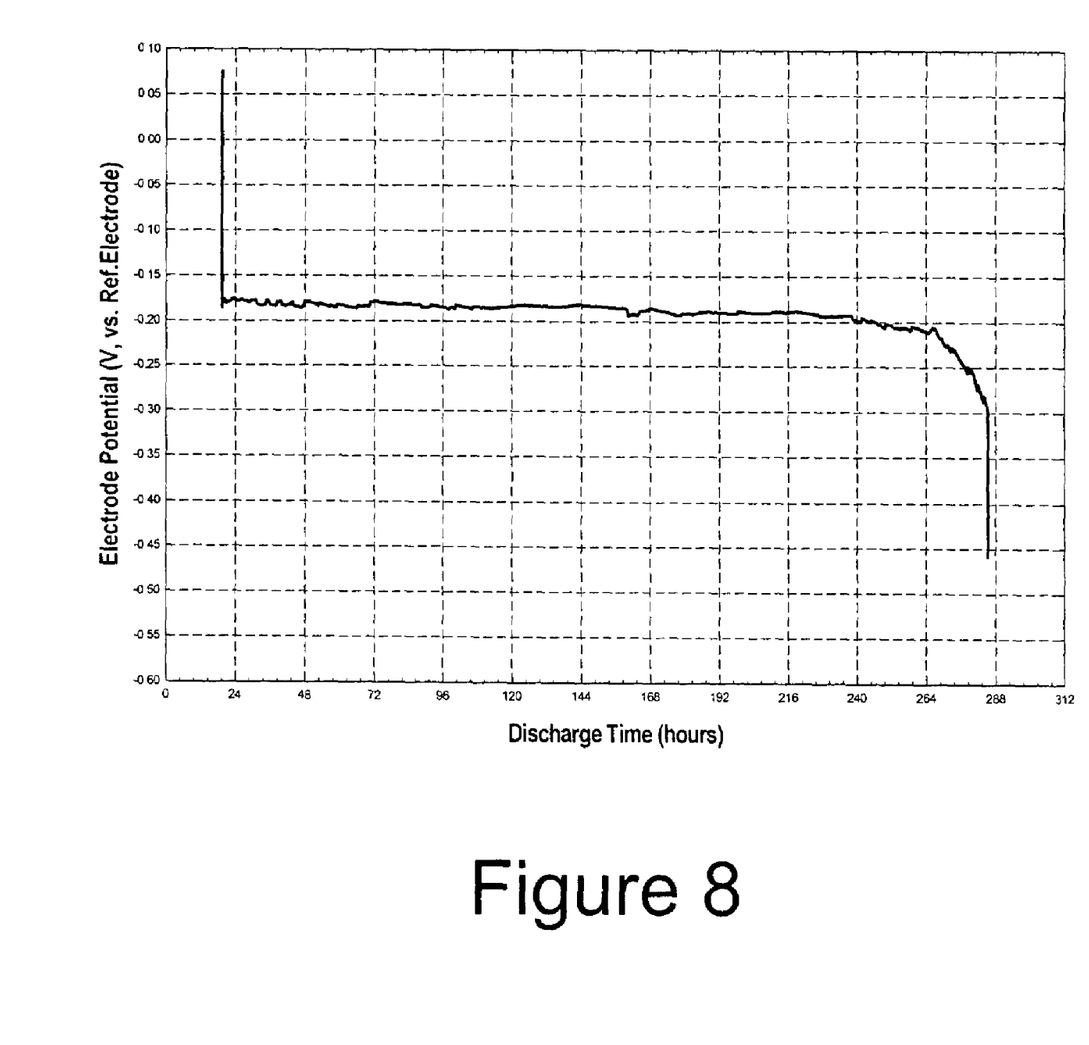
FIG. 8, shows the performance of an oxygen electrode in accordance with the present invention wherein the peroxide decomposition catalyst is sprayed onto the active material layer of the oxygen electrode.

There are several methods by which to incorporate the peroxide decomposition catalyst into the oxygen electrode. The peroxide decomposition catalyst may be incorporated into the oxygen electrode using a variety of methods including, but not limited to: (1) incorporating the peroxide decomposition catalyst into the bulk of the active material layer prior to being formed into the electrode, (2) spraying the peroxide decomposition catalyst onto the surface of the active material layer, (3) precipitating the peroxide decomposition catalyst onto the active material layer, (4) mechanically compressing the peroxide decomposition catalyst into the active material layer, (5) incorporating the catalyst into a separator located at the electrolyte interface of the oxygen electrode, and (6) precipitating the peroxide decomposition catalyst into the active material layer along with the active catalyst material. Shown in FIG. 6, is the performance of an oxygen electrode wherein the active material layer is impregnated with the peroxide decomposition catalyst alone. Shown in FIG. 7, is the performance of an oxygen electrode wherein the peroxide decomposition catalyst is impregnated into the active material layer along with the active catalyst material. Shown in FIG. 8, is the performance of an oxygen electrode wherein the peroxide decomposition catalyst is sprayed onto active material layer prior to being impregnated with the active catalyst material.

A method of incorporating the peroxide decomposition catalyst, namely $MnO_2$, into the active material layer while retaining most of the surface area of the carbon particles is to deposit the peroxide decomposition catalyst onto carbon particles (Cabot BP) and then coat the particles with polytetrafluoroethylene. The teflonated carbon particles are then used to form the active material layer of the oxygen electrode. This process involves wetting the carbon particles with water using ethanol to initiate the process. The slurry of carbon particles in water is heated to 80° C. for 30 minutes to evaporate the alcohol. Although most of the ethanol evaporates away some still remains. The solution is cooled to about 30° C. Added to the carbon slurry is a 0.1M solution of $KMnO_4$, $Mn(NO_3)_2$, or $Mn(COOCH_3)_2$. The solution is stirred for 15 minutes, then it is filtered and washed. The powder is then dried in an oven at 60° C. for 1 hours and baked at 230° C. for 2 hours. The carbon is then ground up and coated with polytetrafluoroethylene. When using $KMnO_4$, the $KMnO_4$ is reduced by the remaining alcohol at the surface of the carbon particles to form a non-stoichiometric compound $KMnO_2$, which is deposited on the surface of the carbon particles.

Figure 9:
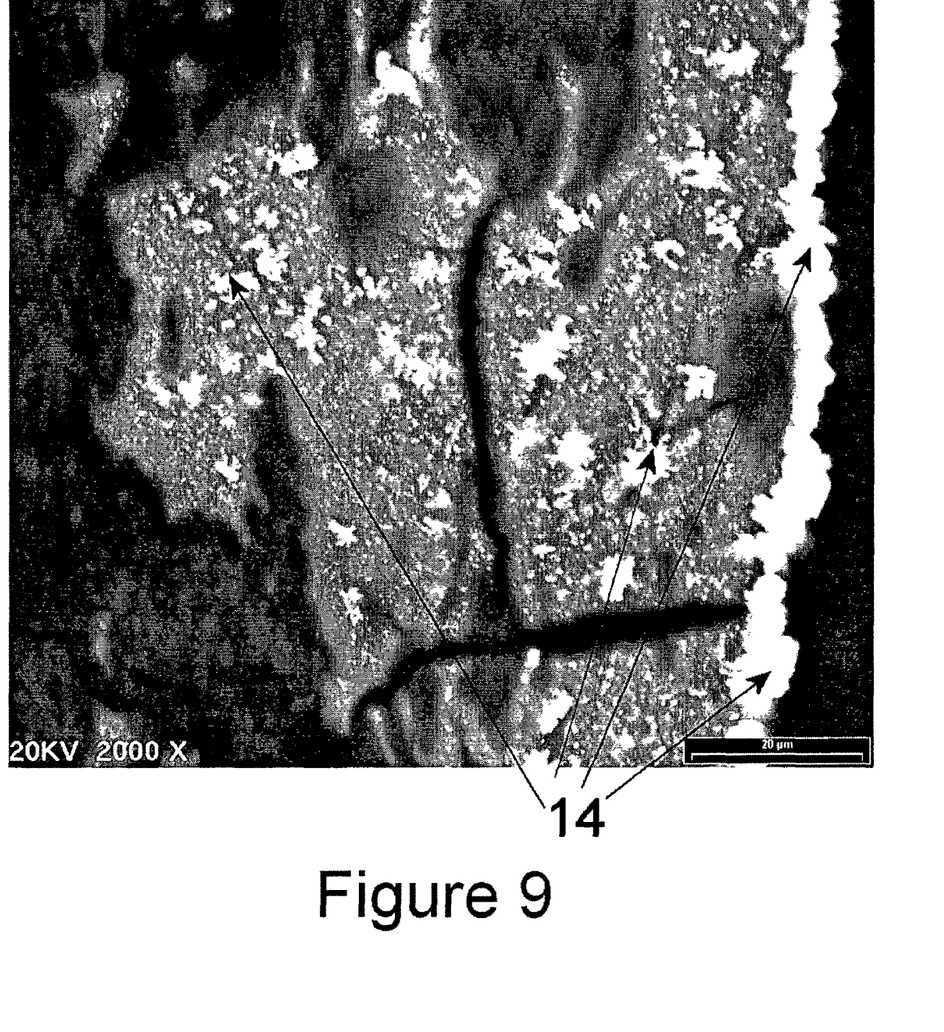
FIG. 9, shows a magnified image of the active catalyst material deposited inside an oxygen electrode in accordance with the present invention.
Figure 10:
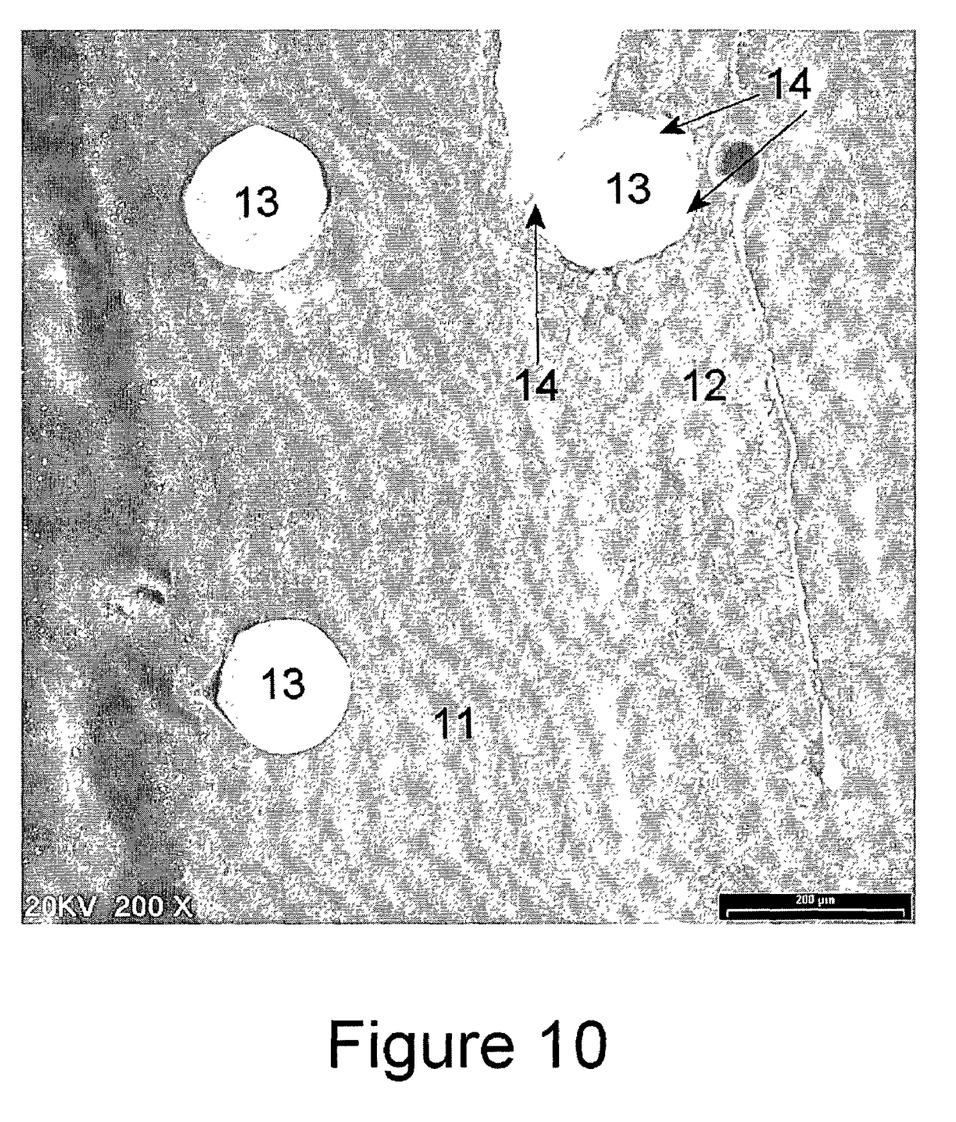
FIG. 10, shows a magnified image of the active catalyst material deposited around the current collector grid in an oxygen electrode in accordance with the present invention.

Once the carbon matrix is produced, the carbon matrix is chemically impregnated with a active catalyst material. The active catalyst material may be deposited from $AgNO_3$, a $AgNO_3/Ga(NO)_3$ mixture, $AgNO_3/LiNO_3$ mixture, $Co(NO_3)_2$, a cobalt amine complex, $NI(NO_3)_2$, $Mn(NO_3)_2$, cyano complexes, organo metallic complexes, amino complexes, citrate/tartrate/lactate/oxalate complexes, transition metal complexes, and mixtures thereof. Due to the higher hydrophobicity of the gas diffusion layer 11 as compared to the active material layer 12, the aqueous solution containing the active catalyst material penetrates only the active material layer 12 thereby allowing deposition of the active catalyst material 14 only in the pores of the active material layer 12. Upon deposition of the active catalyst material 14 within the active material layer 12, the active catalyst material 14 forms submicron to nanoparticles within the pores of the active material layer 12. An image of such particles is shown in FIG. 9. The active catalyst material may also aid in increasing the mechanical integrity of the oxygen electrode. The active catalyst material 14 may fill in voids where the carbon matrix contacts the current collector grid 13 thereby providing increased adhesion between the carbon matrix and the current collector grid 14. An image of the active catalyst material deposited around the current collector grid is shown in FIG. 10. The current collector grids in accordance with the present invention may be selected from, but not limited to, an electrically conductive mesh, grid, foam or expanded metal. The most preferable current collector grid is an electrically conductive mesh having 40 wires per inch horizontally and 20 wires per inch vertically, although other meshes may work equally well. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate. One current collector grid may be used in accordance with the present invention, however the use of two current collector grids is preferred thus increasing the mechanical integrity of the oxygen electrode.

The gas diffusion layer of the oxygen electrode in accordance with the present invention is prepared by coating carbon particles with polytetrafluoroethylene (PTFE). The carbon particles are preferably carbon black known as Vulcan XC-72 carbon (Trademark of Cabot Corp.) Or Acetylene Black, which is well known in the art. The PTFE/carbon mixture contains approximately 40–60 percent PTFE by weight.

The active material layer of the oxygen electrode in accordance with the present invention is prepared by first preparing a carbon matrix. The carbon matrix is composed of carbon particles coated with PTFE. The carbon particles are preferably carbon black particles known as Black Pearl 2000 (Trademark of Cabot Corp.), which is well known in the art. The carbon/PTFE black mixture contains approximately 20 percent PTFE with the remainder being carbon black particles. The carbon/PTFE is then mixed with a peroxide decomposition catalyst to form the carbon matrix. The carbon matrix may contain approximately 0.0 to 50 percent of a peroxide decomposition catalyst with the remainder being the carbon/PTFE mixture. The peroxide decomposition catalyst may be $MnO_2$, MnO, $MoO_3$, $KMnO_2$, cobalt oxides, nickel oxides, iron oxides, transition metal oxides, and mixtures thereof.

The gas diffusion layer is first deposited onto one of the current collector grids. Approximately 6–10 g of gas diffusion layer material is deposited onto the current collector grid per 100 $cm^2$. The active material layer is then deposited onto the gas diffusion layer. Approximately 2–3 grams of active material layer material is deposited onto the gas diffusion layer per 100 $cm^2$. After depositing the gas diffusion layer, the second current collector grid is placed on top of the active material layer to complete the oxygen electrode. The oxygen electrode is pressed at a pressure of 2 tons per 100 $cm^2$. The electrode is subsequently heat treated at 375 degrees Celsius for 15–30 minutes. After heat treating, the oxygen electrode is again pressed at a pressure of 60 tons per 100 $cm^2$. After applying the 60 tons of pressure to the oxygen electrode, the oxygen electrode is ready for impregnation of the active catalyst material into the active material layer.

To impregnate the active material layer with the active catalyst material, the oxygen electrode is dipped into an aqueous solution of an active catalyst material precursor. The active catalyst material precursor may be $AgNO_3$, a $AgNO_3/Ga(NO)_3$ mixture, a $AgNO_3/LiNO_3$ mixture, $Co(NO_3)_2$, a cobalt amine complex, $NI(NO_3)_2$, $Mn(NO_3)_2$, cyano complexes, organo-metallic complexes, amino complexes, citrate/tartrate/lactate/oxalate complexes, transition metal complexes, and mixtures thereof. Instead of adding the peroxide decomposition catalyst to the carbon matrix in the active material layer, the peroxide decomposition catalyst may be deposited from aqueous active material solution and co-impregnated with the active catalyst material into the oxygen electrode. Once submerged in the aqueous active catalyst material precursor solution, the solution may be pulled into the active material layer under vacuum. The varying layers of hydrophobicity between the gas diffusion layer and the active material layer allow the solution to penetrate into the pores within the active material layer and not penetrate into the gas diffusion layer. The aqueous active catalyst material is thereby deposited in the pores within the active material layer and any air or gases present in the solution pass through the gas diffusion layer. After removing the oxygen electrode from the active catalyst material solution, the oxygen electrode is dried at room temperature. The oxygen electrode is then heat treated at 50 degrees Celsius to remove any water from the electrode. Remaining in the pores of the active material layer are excess nitrate from the active catalyst precursor. The oxygen electrode is then heat treated at 300–375 degrees Celsius to decompose the remaining nitrates into oxides. An alternative to heat treating the oxygen electrode after depositing the active catalyst material solution in the pores of the active material layer is to treat the oxygen electrode with NaOH and wash. To add more catalyst the above process is repeated as necessary. Depending on the choice of catalyst, the impregnation process may differ as a result of the carbon acting as a catalyst causing deposition of the active catalyst material. When using $AgNO_3$ as the active catalyst precursor, with carbon acting as a catalyst to reduce the $AgNO_3$ to Ag some of the steps may be omitted.

Alternatively, the carbon powder may be impregnated with the catalyst prior to being formed into the electrode layers. In such instances, the carbon powder is impregnated with the catalyst in the same manner as the electrodes. After impregnation with the catalyst, polytetrafluoroethylene is added to the catalyst impregnated carbon and the mixture is heat treated at 375 degrees Celsius. The catalyst impregnated teflonated carbon is then formed into the electrodes.

In addition to chemical or electrochemical impregnation, the carbon matrix or carbon particles may be impregnated using chemical vapor deposition and plasma vapor deposition techniques.

The foregoing is provided for purposes of explaining and disclosing preferred embodiments of the present invention. Modifications and adaptations to the described embodiments, particularly involving changes to the shape and design of the oxygen electrode, the type of active catalyst material, and the type of carbon used, will be apparent to those skilled in the art. These changes and others may be made without departing from the scope or spirit of the invention in the following claims.

The invention claimed is:

1. An oxygen electrode comprising:
   a porous active material layer;
   a porous gas diffusion layer disposed adjacent to said porous active material layer; and
   a peroxide decomposition catalyst incorporated within said active material layer;

a first current collector grid disposed adjacent to said porous active material layer opposite said porous gas diffusion layer; and a second current collector grid disposed adjacent to said porous gas diffusion layer opposite said porous active material layer;

said porous active material layer and said porous gas diffusion layer each having a built-in hydrophobic character wherein said porous gas diffusion layer has a greater hydrophobic character than said porous active material layer.

2. The oxygen electrode according to claim 1, wherein said porous active material layer comprises 0–50% by weight of said peroxide decomposition catalyst.

3. The oxygen electrode according to claim 1, wherein said peroxide decomposition catalyst is incorporated onto the surface of said active material layer.

4. The oxygen electrode according to claim 1, wherein said peroxide decomposition catalyst is selected from a group consisting of $MnO_2$, MnO, $MoO_3$, $KMnO_2$, cobalt oxides, nickel oxides, iron oxides, transition metal oxides, and mixtures thereof.

5. The oxygen electrode according to claim 1, wherein said porous active material layer comprises a carbon matrix.

6. The oxygen electrode according to claim 5, wherein said carbon matrix comprises a plurality of polytetrafluoroethylene coated carbon particles.

7. The oxygen electrode according to claim 6, wherein said plurality of polytetrafluoroethylene particles contain 15–25% polytetrafluoroethylene by weight.

8. The oxygen electrode according to claim 5, wherein said carbon matrix is impregnated with an active catalyst material.

9. The oxygen electrode according to claim 8, wherein said active catalyst material is impregnated within said carbon matrix using a precursor selected from a group consisting of $AgNO_3$, a $AgNO_3/Ga(NO)_3$ mixture, a $AgNO_3/LiNO_3$ mixture, $Co(NO_3)_2$, a cobalt amine complex, $NI(NO_3)_2$, $Mn(NO_3)_2$, cyano complexes, organo-metallic complexes, amino complexes, citrate/tartrate/lactate/oxalate complexes, transition metal complexes, and mixtures thereof.

10. The oxygen electrode according to claim 8, wherein said active catalyst material forms submicron to nano particles within said carbon matrix.

11. The oxygen electrode according to claim 8, wherein said carbon matrix is chemically impregnated with said active catalyst material.

12. The oxygen electrode according to claim 8, wherein said carbon matrix is electrochemically impregnated with said active catalyst material.

13. The oxygen electrode according to claim 8, wherein said carbon matrix is impregnated with said active catalyst material via chemical vapor deposition.

14. The oxygen electrode according to claim 8, wherein said carbon matrix is impregnated with said active catalyst material via plasma vapor deposition.

15. The oxygen electrode according to claim 1, wherein said porous gas diffusion layer comprises a carbon matrix.

16. The oxygen electrode according to claim 15, wherein said carbon matrix comprises a plurality of polytetrafluoroethylene coated carbon particles.

17. The oxygen electrode according to claim 16, wherein said plurality of polytetrafluoroethylene coated carbon particles contains 40–60% polytetrafluoroethylene by weight.

18. The oxygen electrode according to claim 1, wherein said first current collector grid and said second current collector grid each comprise at least one selected from the group consisting of mesh, grid, matte, expanded metal, foil, foam and plate.

* * * * *